P. B. BLISH & C. M. BRUFF.
SWITCH ROD ADJUSTMENT.
APPLICATION FILED FEB. 29, 1908.
928,931.
Patented July 27, 1909.
6 SHEETS—SHEET 1.
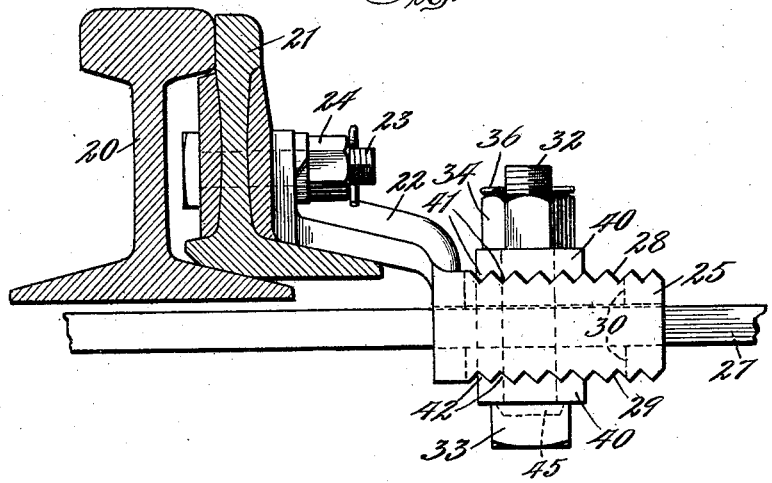
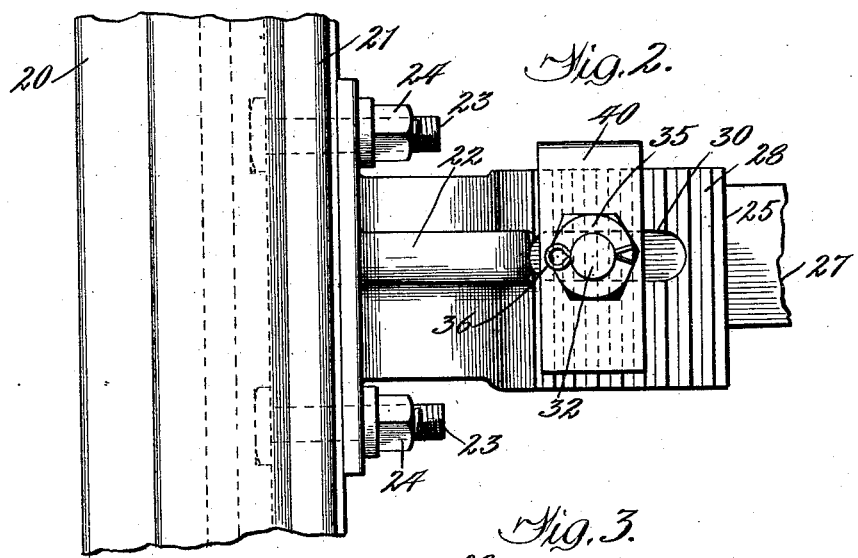
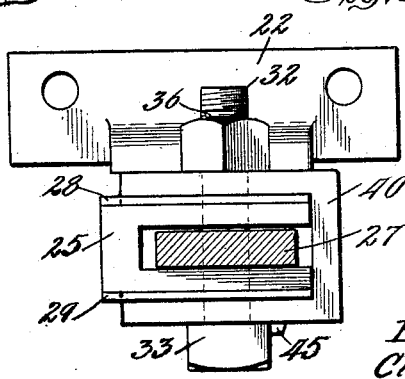
Witnesses:
Inventors
Phillip B. Blish
Charles M. Bruff
By Cheever & Cox
Attys

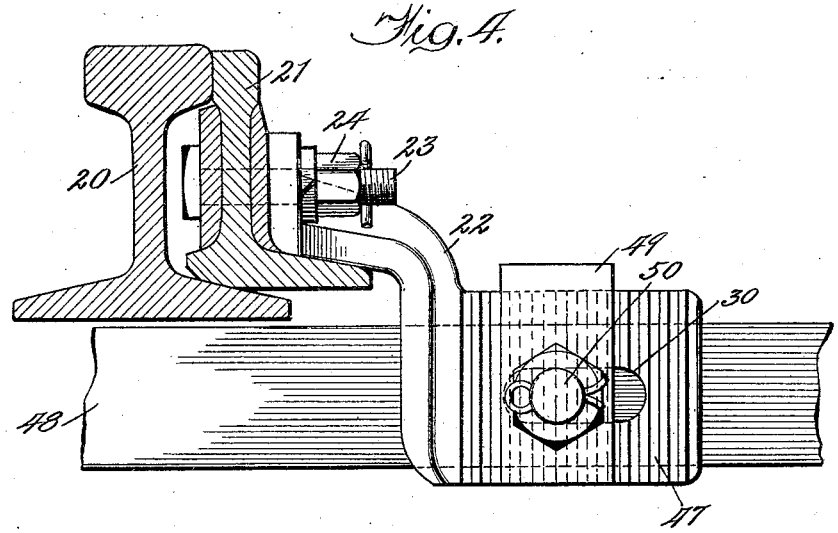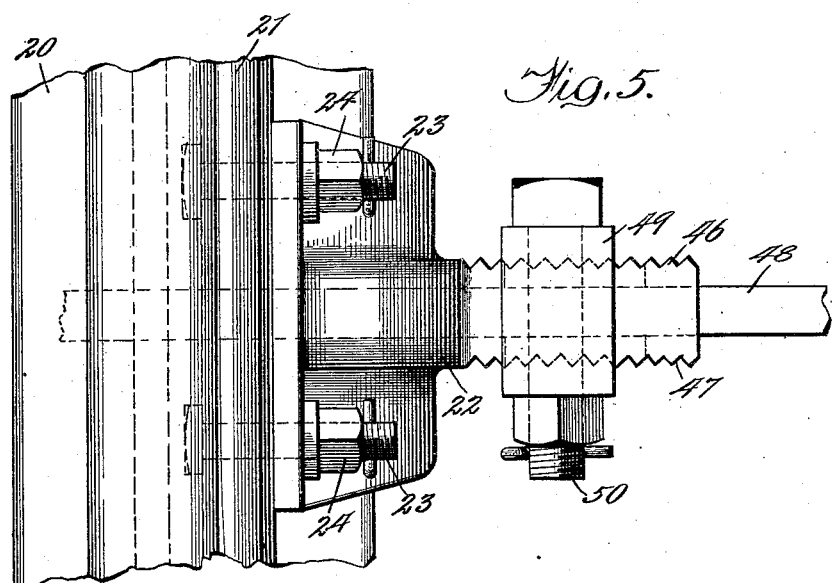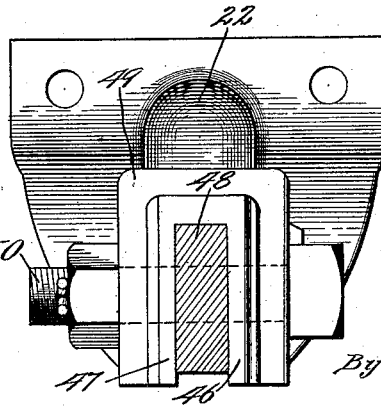

P. B. BLISH & C. M. BRUFF.
SWITCH ROD ADJUSTMENT.
APPLICATION FILED FEB. 29, 1908.
928,931.
Patented July 27, 1909.
6 SHEETS—SHEET 3.
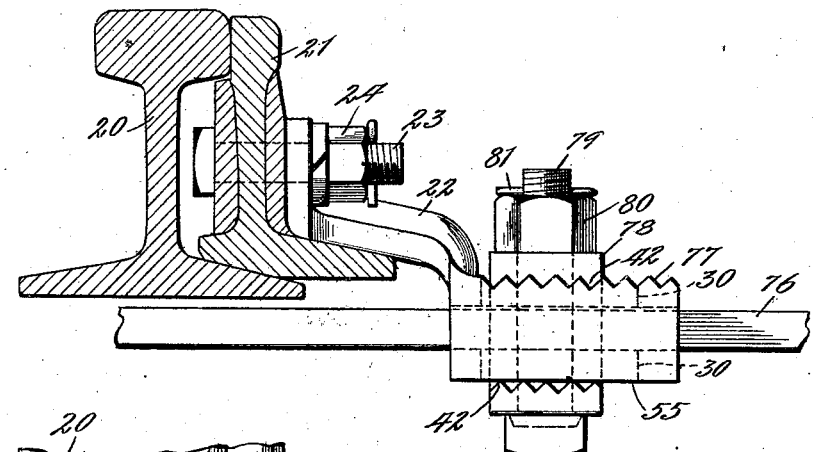
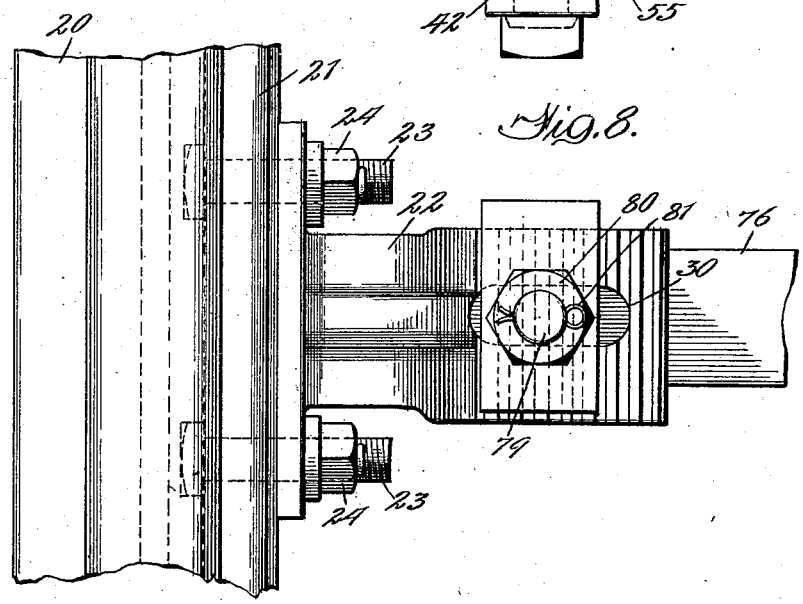
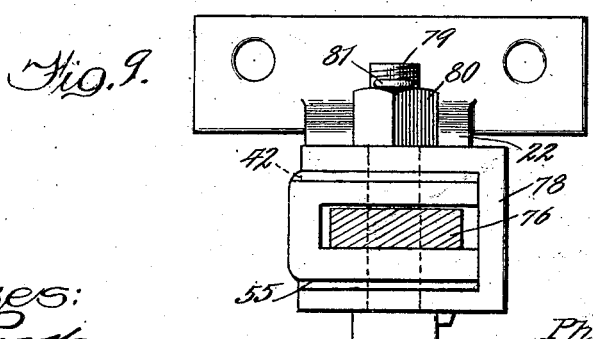

P. B. BLISH & C. M. BRUFF.
SWITCH ROD ADJUSTMENT.
APPLICATION FILED FEB. 29, 1908.
928,931.
Patented July 27, 1909.
6 SHEETS—SHEET 4.
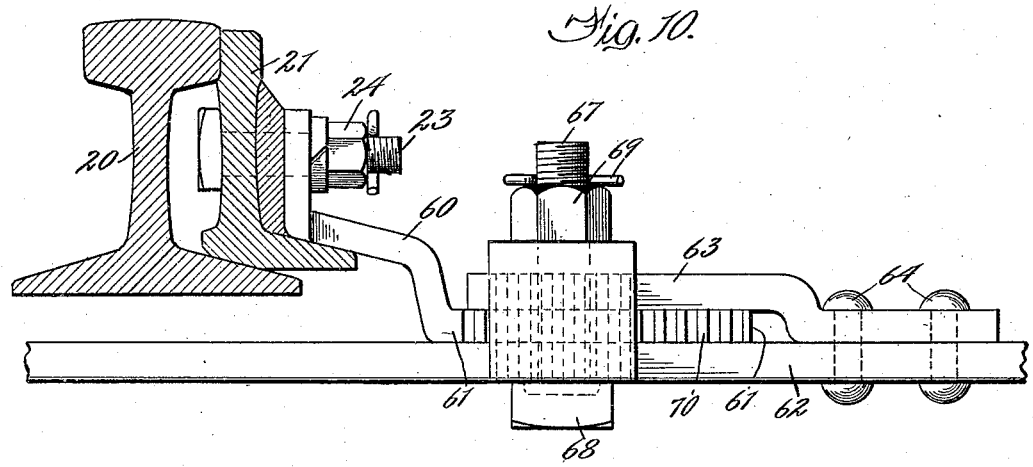
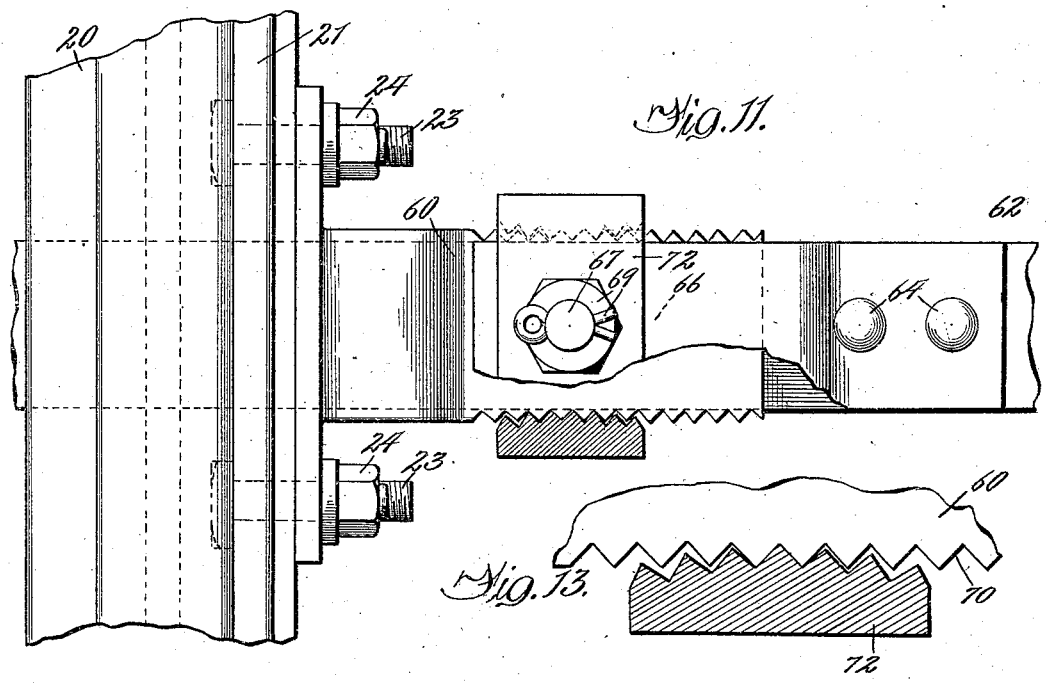
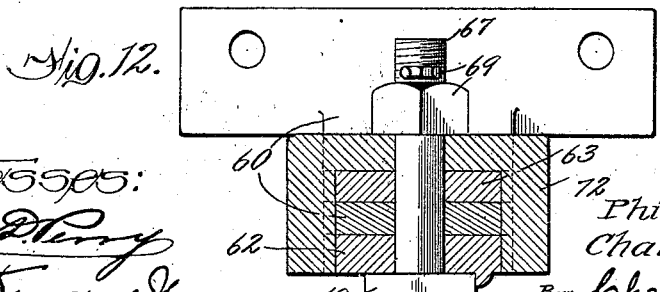
Witnesses:
Inventors
Phillip B. Blish
Charles M. Bruff
By Cheever & Cox
Attys P. B. BLISH & C. M. BRUFF.
SWITCH ROD ADJUSTMENT.
APPLICATION FILED FEB. 29, 1908.
928,931.
Patented July 27, 1909.
6 SHEETS—SHEET 5.
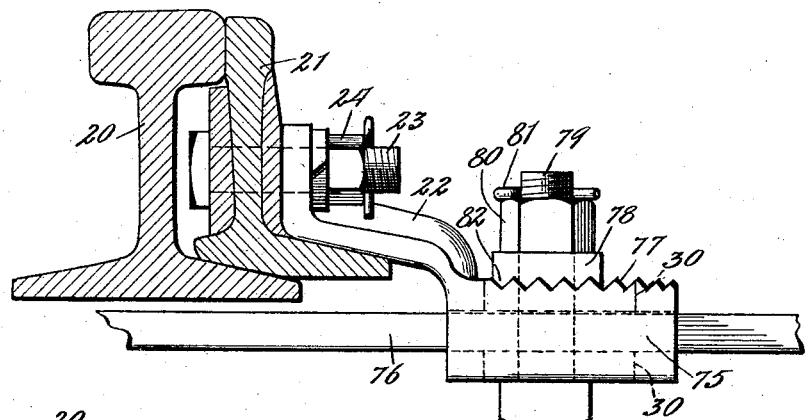
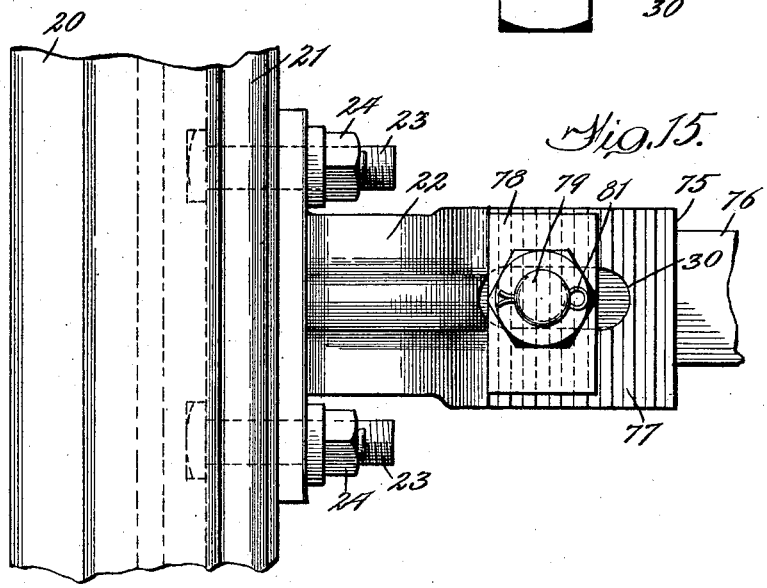
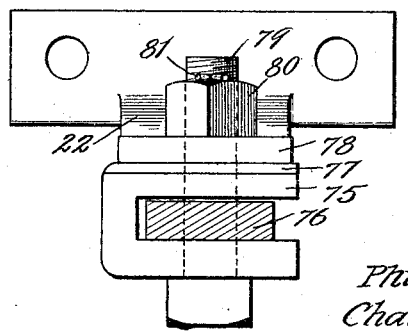
Witnesses:
Inventors
Phillip B. Blish
Charles M. Bruff
By Cheever & Cox
Attys

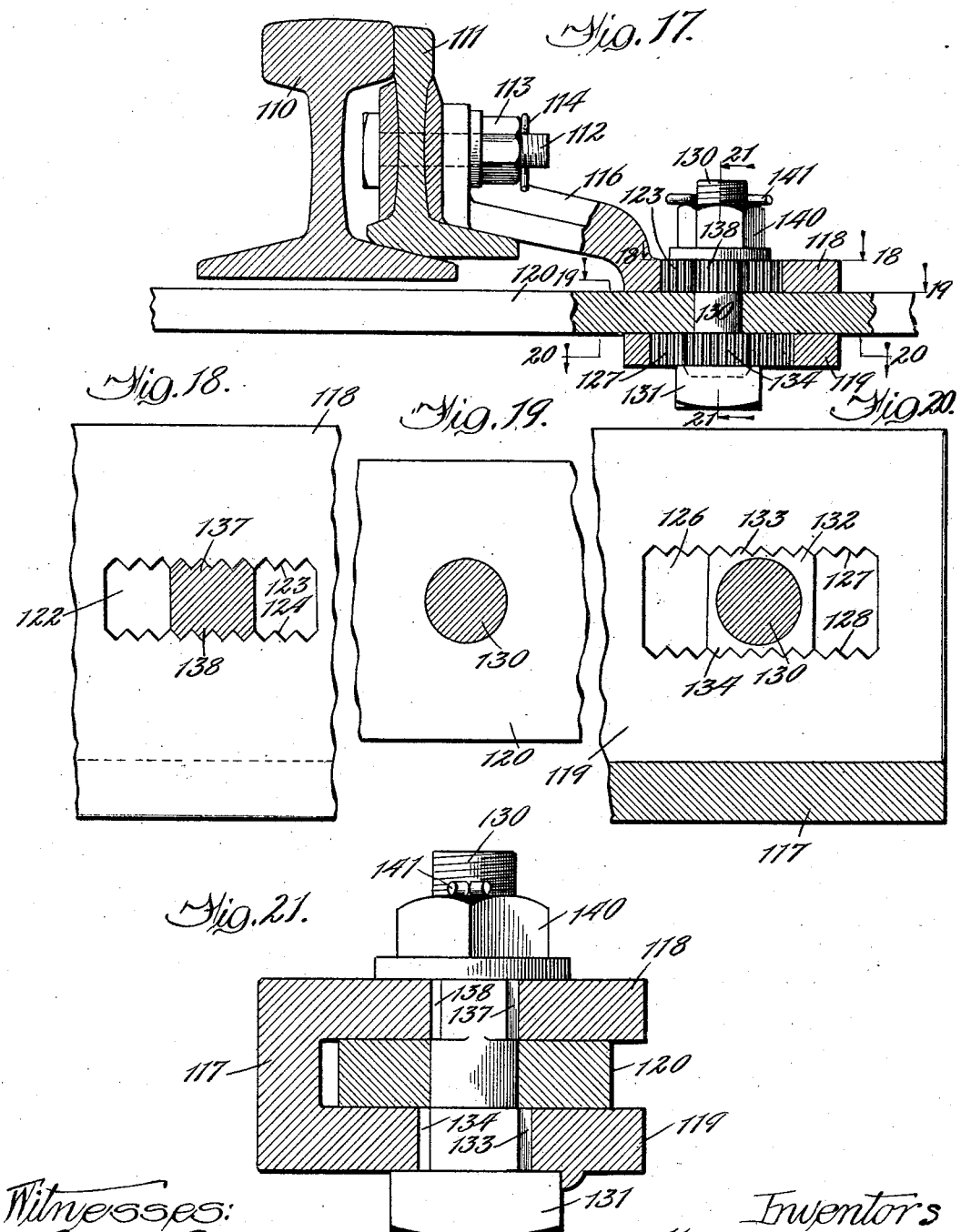

UNITED STATES PATENT OFFICE.

PHILLIP B. BLISH, OF CHICAGO, AND CHARLES M. BRUFF, OF CHICAGO HEIGHTS, ILLINOIS, ASSIGNORS TO MORDEN FROG & CROSSING WORKS, OF CHICAGO, ILLINOIS, A CORPORATION OF ILLINOIS.

SWITCH-ROD ADJUSTMENT.

No. 928,931.     Specification of Letters Patent.     Patented July 27, 1909.

Application filed February 29, 1908. Serial No. 418,579.

*To all whom it may concern:*

Be it known that we, PHILLIP B. BLI and CHARLES M. BRUFF, citizens of the United States, residing, respectively, at Chicago and Chicago Heights, Cook county, Illinois, have invented a new Improvement in Switch-Rod Adjustments, of which the following is a specification, reference being had to the accompanying drawings, in which similar numerals represent similar parts throughout the several views.

This invention relates to switch rod adjustments, or in other words to devices for varying the length of the connection between two opposite switch points so that the points of the switch may accurately fit the adjacent rails and consequent derailment to trains being avoided.

The object of the invention is to provide a neat and economical device of the class described which can be very easily adjusted in operation and which cannot in practice get out of order.

The invention consists in a device capable of accomplishing the foregoing objects in which the adjusting parts are locked by the engagement of roughened surfaces placed in various ways upon the device as illustrated in the drawings hereto attached showing numerous modifications of the device.

More in detail the invention consists in the use of a supplemental block having a serrated surface interposed next to or attached to the head of a bolt which passes through both parts of the switch rod which are to be joined and is adjustable in position as to one of them, the supplemental locking member engaging by said roughened surfaces a corresponding surface upon the member to be joined which is movable with reference to the bolt.

The invention further consists in details of construction which will be hereafter more fully described and claimed as the specification proceeds.

Figure 1 is a side, Fig. 2 a plan and Fig. 3 an end view of a device embodying this invention in its preferred form. Figs. 4, 5 and 6 are respectively side, plan and end views of a modification of the preferred form which will be hereafter referred to as the "first modification". Figs. 7, 8 and 9 are respectively side, plan and end views of a "second modification". Figs. 10, 11 and 12 are respectively side, plan and end views of the "third modification". Fig. 13 is an enlarged detail view taken at the edge of the serrated engagement surfaces illustrated in Fig. 11. Figs. 14, 15 and 16 are respectively side, plan and end views of a "fourth modification" of this invention. Referring now to the "fifth modification," Fig. 17 is a side view of mechanism illustrating this form of invention. Fig. 18 is a plan view taken on the line 18 of Fig. 17. Fig. 19 is a plan view taken on the line 19 of Fig. 17. Fig. 20 is a plan view taken on line 20 of Fig. 17 and Fig. 21 is a vertical sectional end view taken on the line 21—21 of Fig. 17.

Throughout all of the views prior to Fig. 17 one of the main rails of the track to which the device is applied is indicated by the numeral 20 and the adjacent switch point 21, and the object of the device is to vary the distance between this switch point 21 and another switch point not shown adjacent to another rail not shown at the right of each of the Figs. 1, 4, 7, 10 and 14 and 17.

Referring now to the preferred form of construction shown in Figs. 1, 2 and 3 a switch lug 22 is provided secured to the switch point 21 by means of the bolt 23 and nut 24 in the ordinary manner. The opposite end of this switch lug 24 terminates in this particular case in an open side socket 25 of the ordinary general type having between its jaws an opening in which the switch rod proper 27 is adapted to slide backward and forward. Upon the upper face of the open side socket 25 are serrated teeth 28 or other devices forming a uniformly roughened surface and upon the bottom of the socket is a correspondingly roughened surface 29. Through both jaw members of the side socket 25 are cut parallel elongated slots 30 best seen in Fig. 2. Through these slots 30 and through a single circular hole in the switch rod 27 is a bolt 32 having on either end (in the particular case here shown the bottom end) a head 33 and on the opposite end a nut 34 adapted to engage the screw threads 35, preferably adapted to be permanently secured in position by a cotter pin 36.

In order to lock the open side socket 25 in any desired position, within the limits of the length of the slots 30 upon the switch rod 27 a U shaped locking block or clevis shaped member 40 is provided having as shown on its upper member teeth 41 engaging the teeth 28 on the upper surface of the open side socket and on its lower member teeth 42 engaging the teeth 29 on the lower member of the open side socket. Through each branch of this clevis shaped member 40 is a hole through which the bolt 32 passes, said bolt being shaped so that there is no adjustment between the clevis and the bolt (other than the ability to remove the bolt from the clevis). This clevis is so constructed and its teeth are so shaped that it will easily slide onto the open side socket in the manner shown but that it is impossible to move the open side socket and the clevis horizontally with respect to each other in the direction of length of the switch rod (as seen in Fig. 1) and consequently the open side socket is locked to the clevis and the clevis is locked to the bolt and the bolt is locked to the switch rod 27 with the result that all of the parts are in fixed relation to each other. When now the operator desires to adjust the horizontal relationship of the open side socket with reference to the switch rod 27 and consequently adjust the distance between the switch points the fastenings of the bolt 32 are first removed and it is removed from engagement with the clevis and the intervening members. The operator then slips the locking member 40 out of engagement with the roughened surfaces of the socket and by hand moves the adjacent switch points to proper position thereby moving the rod 27 in the open side socket or the socket with reference to the rod. When this has been done the operator replaces the locking clevis in position upon the open side socket and reinserts the bolt 32 through the parts in their new position thereby locking and firmly securing all of the parts in their new permanent position.

Manifestly if the head 33 of the bolt is placed uppermost no fastenings are really needed upon the opposite end of the bolt but in practice these are provided for abundant safety and in accordance with the latest railroad practice are placed uppermost as shown in the drawings so that the track inspector can readily see that the fastenings 34 and 36 are in place. By this construction a readily adjustable and yet very secure fastening is provided for the purpose named.

In order to readily apply the nut 34 to the bolt 32 a lug 45 is provided upon the locking block or clevis so that the head 33 of the bolt engages the lug and therefore the bolt cannot be turned with the result that nut 34 is readily applied and removed. This lug 45 forms no part of this invention.

Referring now to the first modification illustrated in Figs. 4, 5 and 6 the structure is the same as the preferred form except that an open bottom socket having jaws 46 and 47 is used to inclose the switch rod 48 which is in this instance placed vertically instead of horizontally as rod 27 is. The clevis 49 of this modification therefore slips vertically instead of horizontally upon the jaws 46 and 47 and the bolt 50 is horizontal instead of vertical as in the preferred form. Except as the direction of movements of the various parts are changed, because of these changes of position the operation of the first modification is identical with that of the preferred form.

In Figs. 7, 8 and 9 is shown another or "second modification" of the device identical with that of Figs. 1, 2 and 3 except that the teeth 29 on the lower open side socket jaw are omitted and a plane surface 55 is substituted just engaging the tops of the teeth 42 of the lower jaw of the clevis. The device of this modification is not as satisfactory as that of the preferred form but as it is operative and to a certain extent practical it is here shown.

In the "third modification" illustrated in Figs. 10, 11, 12 and 13 the switch lug 60 carries the flat plate member 61 adapted to movably fit between the switch rod 62 and a jaw member 63 secured thereto by bolts or rivets 64. In the central portion of the member 61 heretofore described is an elongated slot 66 through which the bolt 67 is adapted to fit, said bolt engaging the members 62 and 63 in circular holes in such a way that the bolt does not move longitudinally of the member 62 and 63. This bolt 67 has on one end a head 68 and on the other end fastening devices 69 as in the other previously described structures. On the vertical edges of the member 61 heretofore described are cut serrated teeth 70 as best seen in Fig. 1. In order to lock the members 61 in any selected position with reference to the switch rod 62 a clevis locking member 72 is provided adapted to drop over the parts 62, 61 and 63 as shown and engage the teeth 70 heretofore described. As the bolt 67 passes through an equal sized hole in this clevis the clevis is not movable with reference to the bolt with the result that the device locks the parts in position. When the operator desires to make an adjustment he moves the bolt 67, lifts the clevis out of engagement with the teeth 70; then adjusts the parts 61 with reference to the part 62 reinserts the clevis and reinserts the bolt.

In the "fourth modification" shown in Figs. 14, 15 and 16 the arrangement of parts is very similar to the preferred form and to the second modification the only essential difference being that the open side socket 75 within which the switch rod 76 moves has only one serrated surface 77 and a rectangular block 78 is used in place of the clevis shaped locking block. In this construction the strain is carried from the member 75 through the teeth 77 onto the block 78 and thence to the bolt 79 in exactly the same manner as in the preferred form. While this modification has the disadvantage of not having two serrated surfaces to transmit this strain it has the advantage that it is not necessary to entirely remove the nut 80 from the bolt 79 in order to make an adjustment. In this structure the operator need remove the cotter pin 81 and lift the nut 80 only a sufficient distance so that the teeth 82 on the block 78 clear the teeth 77. When this is done the operator may adjust the parts 75 and 76 with reference to each other and then place the block 78 in its new adjusted position upon the teeth 77 and resecure the bolt, this without having entirely removed the nut 80. On the other hand this modified form of device is not quite as strong and therefore not quite as satisfactory in commercial practice as the preferred form.

Referring again to the drawings for the "fifth modification", Figs. 17–21, numeral 110 indicates the rail and 111 the switch point. Rigidly secured to this switch point by means of bolt 112 and the attached nut 113 and cotter pin 114, is a switch lug 116, containing at its opposite end an open side socket 117 of the ordinary type, having an upper jaw 118 and a lower jaw 119. Between the jaws 118 and 119 of this socket 117 is the switch rod proper 120, adapted to slide backward and forward between said jaws. In the upper jaw 118 of the socket is cut a slot 122 having on opposite sides serrated teeth 123 and 124. It will be noticed that these slots run lengthwise of the open side socket in the direction in which adjustment is to be made between the two parts to be joined, viz., between the parts 117 and 120.

Through a suitable hole in the switch rod 120 is a bolt 130 having on its lower portion a head 131 above which there is slipped upon the bolt a block 132 containing serrated teeth 133 and 134 adapted to engage respectively with the teeth 127 and 128 in the slot 126. This block 132 might be made integral with the bolt but for convenience in manufacture it is made separate. The block is, as shown, larger than that portion of the bolt 130 which passes through the rod 120. The upper portion of this bolt is reduced in size at the point where it passes through the upper jaw 118, and has upon it, on its shank, serrated teeth 137 and 138 adapted to respectively engage with the teeth 123 and 124, heretofore described. Upon the upper portion of the bolt 130 are a nut 140 and cotter pin 141, adapted to secure the parts in suitable position. The enlarged portion 138 is of less size than the circular portion of the bolt which passes through the switch rod 120 so that the bolt may be inserted and removed through said hole as desired.

In the operation of the device for the purpose of adjusting the relation between the open side socket and attached parts and the switch rod 120, the operator first removes the bolt 130 and moves the parts 117 and 120 to approximately the desired position, and then inserts the bolt through the parts, the teeth of the member 137 engaging with the teeth of the slot 122 and the teeth of the member 134 engaging with the teeth of the slot 126, with the result that when the nut 140 and cotter pin 141 are applied, the device is securely locked in desired position.

When wear takes place between the switch points and it is desired to make a further adjustment, the operator loosens the fastenings of the bolt and knocks it out of engagement with the various parts, with the result that the operator may move the switch point and the adjusting parts to a new position and then reinsert the bolt, the respective serrated teeth of the bolt of course engaging a new set of teeth in the respective slots.

It will be noted that in the "fourth modification" the locking block may be made integral upon the head of the bolt and in the "fifth modification" the block is in one instance integral upon the bolt. The words "adjustable" and "non adjustable" and modifications thereof used in the claims refer to the movements of the parts in the direction in which the switch rod is to be adjusted and have no reference to the movement or non movement of the bolt along its axis or movement of other parts of the device parallel to the axis of the bolt.

What we claim as new and desire to secure by Letters Patent, is:

1. In a switch rod adjustment device, the combination of two parts to be joined, one of them containing a slot extending in the direction in which adjustment is to be made between the parts, said part containing the slot also carrying a roughened surface and a clevis shaped member adapted to fit snugly over said parts to be joined, said clevis having in one portion a roughened surface adapted to selectively engage the roughened surface on the member having the slot and a bolt passing through said clevis and said members to be joined and through said slot for the purposes specified.

2. In a switch rod adjustment device, the combination of two parts to be joined, one of them containing a slot extending in the direction of desired adjustment between the parts, the bolt passing through said slot and through the other member to be joined and a U shaped locking member adapted to fit over the parts to be joined and to be secured in position by said bolt, said locking member containing on one of its members equal spaced serrations or ridges running crosswise of the line of adjustment of parts to be adjusted adapted to positively but selectively engage a corresponding roughened surface located upon the member containing the slot.

3. In a switch rod adjustment device, the combination of a part to be joined, another part to be joined inclosing said first part on at least two opposite sides, a clevis shaped locking member adapted to fit over said two inclosing parts and positively frictionally engaging the same in different selective positions and a bolt or pin passing through all the parts heretofore mentioned adjustably engaging the inclosing parts and non adjustably engaging the other members.

4. In a device of the class described, the combination of a switch rod and a socket inclosing said switch rod on at least two sides, a bolt passing through the switch rod non adjustable thereto and also passing through slots in the socket, said slots being elongated in the direction in which adjustment is to take place, and a clevis locking member also non adjustably mounted upon the bolt inclosing said jaws of the socket there being serrated surfaces on each jaw of the socket engaging corresponding surfaces on the interior of each jaw of the clevis, the whole so arranged that on removing the bolt adjustment may be made as described.

In witness whereof, we have hereunto subscribed our names in the presence of two witnesses.

PHILLIP B. BLISH.
CHARLES M. BRUFF.

Witnesses:
DWIGHT B. CHEEVER,
HOWARD M. COX.